(No Model.) 2 Sheets—Sheet 1.
O. A. DODGE.
DEVICE FOR SQUARING SOFT BRICKS.
No. 533,843. Patented Feb. 5, 1895.
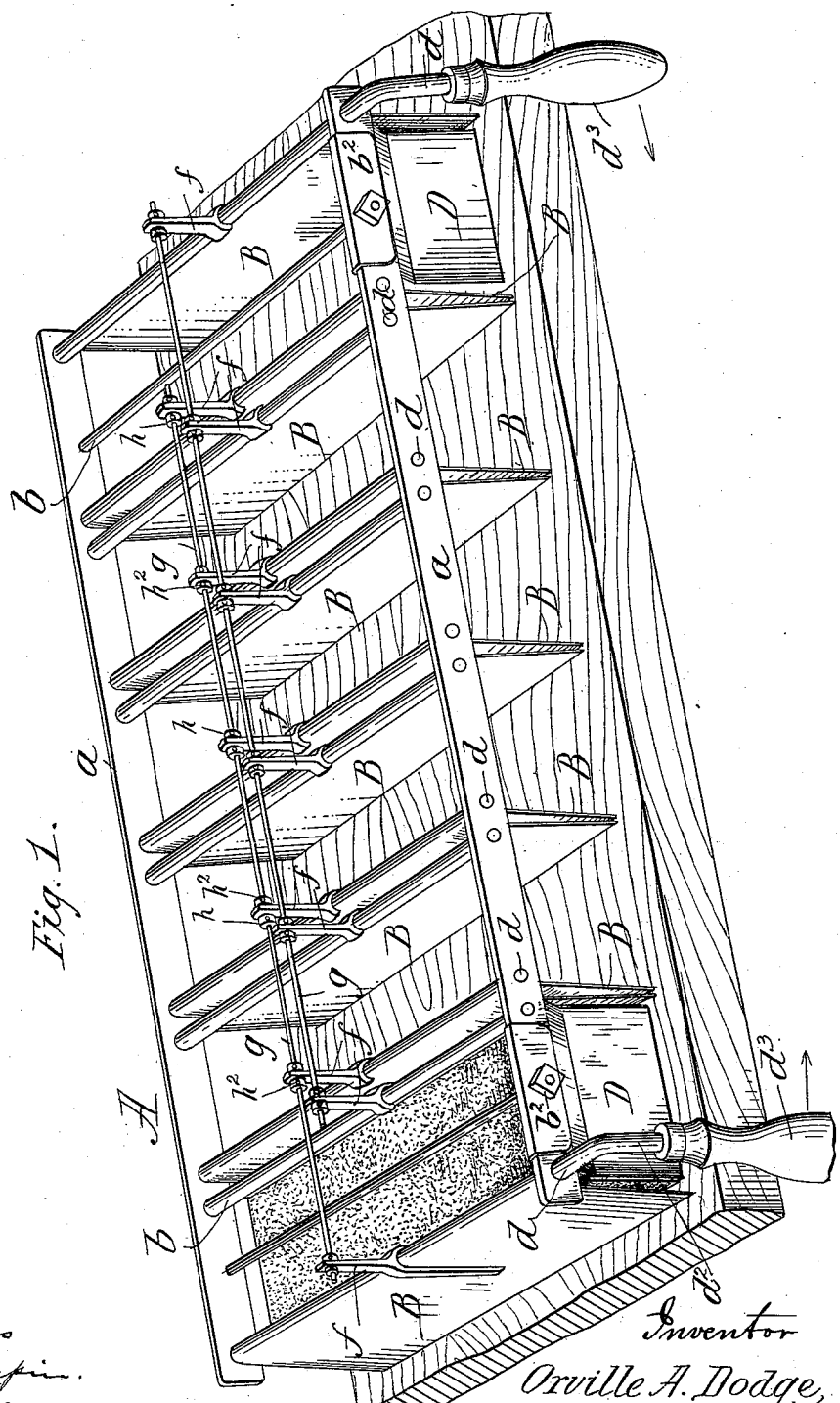
Witnesses
Wm H Chapin
A. J. Clemons
Inventor
Orville A. Dodge,
By Chapin & Co
attys (No Model.)
2 Sheets—Sheet 2.
O. A. DODGE.
DEVICE FOR SQUARING SOFT BRICKS.
No. 533,843.
Patented Feb. 5, 1895.
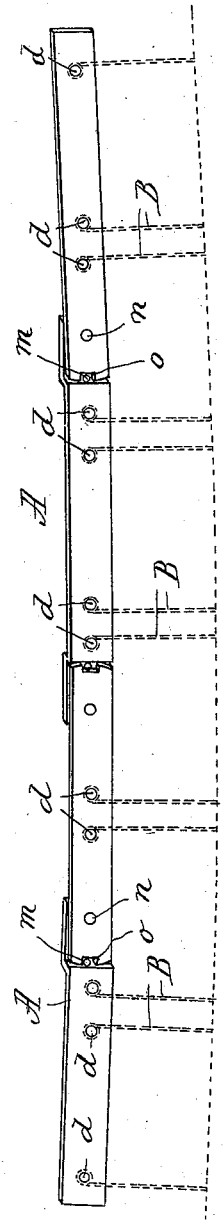
Witnesses
Inventor
Orville A. Dodge,
By Chapin & Co.
Attys

UNITED STATES PATENT OFFICE.

ORVILLE A. DODGE, OF SPRINGFIELD, MASSACHUSETTS, ASSIGNOR OF ONE-HALF TO AMBROSE H. GARDNER, OF SAME PLACE.

DEVICE FOR SQUARING SOFT BRICKS.

SPECIFICATION forming part of Letters Patent No. 533,843, dated February 5, 1895.

Application filed November 30, 1894. Serial No. 530,377. (No model.)

*To all whom it may concern:*

Be it known that I, ORVILLE A. DODGE, a citizen of the United States of America, residing at Springfield, in the county of Hampden and State of Massachusetts, have invented new and useful Improvements in Devices for Squaring Soft Bricks, of which the following is a specification.

This invention relates to devices or implements for squaring and truing the opposite sides of "green," and more especially such as are known as "pallet" bricks, after they have been discharged from the inverted brick mold upon the support therefor on which they are left to dry, the squaring being, as well known, often found desirable for truing up those bricks which, while still in a plastic condition, have become distorted or uneven in form; and the invention consists in a machine or implement comprising a suitable frame, a series of parallel plates movably supported by the frame, pairs thereof being adapted to embrace a series of the soft bricks, and means for operating the plates so that pairs thereof will be moved to their approached squaring and truing impacts against opposite sides of the bricks; and, furthermore, the invention consists in constructions and combinations of parts all substantially as will hereinafter more fully and particularly appear and be set forth in the claims.

Reference is to be had to the accompanying drawings, in which the improved brick-squaring implement is illustrated in perspective in Figure 1,—while in Fig. 2, which is a partial side view, a modified construction is shown.

In the drawings, A represents a long, rectangular frame comprising the longitudinal side-bars, $a, a$, and the transverse bolt-rods, $b, b$, which are rigidly secured to the side-bars by nuts, $b^2, b^2$.

$d, d$ represent rocker-shafts transversely and horizontally mounted for their rocking movements upon and between the said side-bars, $a, a$, each having rigidly secured thereto and depending therefrom, a flat, rigid plate, B, of approximately the size of the long edge-face of a brick. Each of these plates has an upwardly extended arm, $f$, which is transversely apertured for the passage therethrough of a coupling-rod, $g$, the coupling-rod having connection with alternate pairs of the arms, $f$, as shown. The rock-shafts, $d, d$, at each end of the implement, are forwardly extended and cranked, as seen at $d^2$, and provided with the crank-handles, $d^3$.

The brickmaker may, by grasping the handles, $d^3, d^3$, by his two hands, bring the device so that the half dozen pairs, more or less, of the hinge-supported squaring-plates, B, B, may be brought to opposite sides of the corresponding series of soft bricks which have been transferred from the mold upon the support on which they are to be dried.

In bringing the device to juxtaposition relative to the bricks, the handles are swung, as seen in the drawings, slightly away from each other, so that the spaces between the several pairs of the squaring plates will be at their maximum. Then having brought the device into its position for operation the handles are forcibly moved toward each other, whereupon as will be apparent from an inspection of the drawings, every other squaring plate, B, including and counting from the left, will have a movement toward the right, while every other squaring-plate, B, including and counting from the right, will have its movement toward the other plates toward the left, the limit of these movements being such as to bring all of the plates into parallel planes for the manifest brick-squaring effect.

In order that the movements imparted by the handles, $d^3$, to the rock-shafts at the ends of the frame, A, and through the coupling-rods, $g, g$, properly to the intermediate rock-shafts may be limited, and so that all of the squaring plates will have their movements limited to the correct extent, stops are provided, and as here shown consist of the stop-plates, D, D, which are secured to, and depend from, one of the side-bars, $a$, occupying a position in a plane at right angles to the lengths of the plates, B, B, and just within the ends thereof, so that they serve as stops to those squaring plates which are at the ends of the machine; and by reason of the fact that the alternate plates of the two series are coupled by the coupling-bars, $g, g$, said plates, D, D, serve as stops for limiting the movements of all the plates.

The length of each stop-plate, D, is preferably the same as the longest dimension at the end of a brick, so that two of the oppositely moving plates at each end of the device may be brought to contact with each stop-plate, although a stop at each end, or at any part of the device against which one of each of the oppositely movable series of the squaring plates may contact, would efficiently serve the purpose.

The engagements which the coupling-rods, $g, g$, have with the perforated arms, $f, f$, are such that the assemblage of the parts may be easily acquired, as well, also, as may be readily insured the adjustments of the individual squaring-plates, B, B, whereby when one thereof is in a truly vertical plane, all of the others will also be in a vertical plane parallel thereto. As one means of accomplishing this, collars, $h$, are provided to surround the coupling-rods at both sides of the arms, $f$, which are adjustably confined by set-screws, $h^2$.

Of course, in lieu of the plates, B, being united to move as one with the rock-shafts, $d$, said plates might have their tubular tops surround, for rotation, the cross-shafts, $d$, which might be immovably set between and supported by the side-bars, $a, a$, the plates having the arms, $f, f$, whereby to operate them. This obvious manner of movably supporting the squaring plates is of course practically no different from the one at first referred to, in which the shafts, $d$, are rotatably mounted and the squaring-plates formed as parts of, or rigidly attached thereto.

In Fig. 2 illustration is made of the device having the side-bars of the frame articulated for limited movements, the one section thereof relative to another, so that the brick squaring device may be applicable for operation upon bricks which are supported on shelves or boards which sag more or less at the middle. Here the side-bars are each formed in several sections pivotally united by rivets, or pivot-pins, $n$, and certain of the sections having the slots or apertures, $o$, while the other sections have the stop-pins, $m$. The squaring plates, B, in this arrangement, will be operated substantially in the same manner as hereinbefore described, the limitation of said plates being such that when a pair thereof have their edges at rest upon the brick-supporting shelf or board and are brought to parallelism, they can have no further movement. If desired, a separate limiting stop for each plate may be provided.

Having thus described my invention, what I claim, and desire to secure by Letters Patent, is—

1. A device for squaring and truing soft bricks which consists of a frame and a plurality of squaring plates, B, hinge-supported upon, and depending below, said frame, and each having an upwardly extending arm, cranked handles for lifting the device and having operating connections each with one of the hinge-supported squaring plates, and the coupling-rods, $g, g$, having engagements with the arms of alternating plates, substantially as described.

2. A device for squaring and truing soft bricks, which consists of a frame having the depending stop-plates, D, D, and a plurality of squaring-plates, B, hinge-supported upon, and depending below, said frame, and each having an upwardly extending arm, the cranked handles for lifting the device and having operating connections each with one of the hinge-supported squaring-plates and the coupling-rods, $g, g$, having engagements with the arms of alternating plates, substantially as described.

3. A device for squaring soft bricks which consists of a frame and a plurality of squaring plates, B, hinge-supported upon, and depending below, said frame, and each having an upwardly extended transversely perforated arm, $f$, the coupling rods, $g, g$, passed through the perforations of alternating arms, $f$, and having thereon adjustably confined collars at both sides of the said arms, and lifting and operating handles having operating connections with two of the squaring plates, substantially as described.

ORVILLE A. DODGE.

Witnesses:
WM. S. BELLOWS,
J. D. GARFIELD.